US009574958B2

(12) United States Patent
Zhong et al.

(10) Patent No.: US 9,574,958 B2
(45) Date of Patent: Feb. 21, 2017

(54) TORQUE SENSOR

(71) Applicant: Infineon Technologies AG, Neubiberg (DE)

(72) Inventors: Hongsheng Zhong, Chengdu (CN); Xiulin Zhong, Chengdu (CN); Wei You, Chengdu (CN); Yoon Fatt Francis Foo, Singapore (SG); Lifeng Guan, Singapore (SG); Li Su, Shanghai (CN); Ling Wang, Chengdu (CN)

(73) Assignee: Infineon Technologies AG, Neubiberg (DE)

( * ) Notice: Subject to any disclaimer, the term of this patent is extended or adjusted under 35 U.S.C. 154(b) by 401 days.

(21) Appl. No.: 14/134,613

(22) Filed: Dec. 19, 2013

(65) Prior Publication Data

US 2014/0174201 A1 Jun. 26, 2014

Related U.S. Application Data

(60) Provisional application No. 61/757,888, filed on Jan. 29, 2013.

(30) Foreign Application Priority Data

Dec. 20, 2012 (CN) .......................... 2012 1 0556327

(51) Int. Cl.
*G01L 3/02* (2006.01)
*G01L 3/10* (2006.01)

(52) U.S. Cl.
CPC ............... *G01L 3/101* (2013.01); *G01L 3/104* (2013.01)

(58) Field of Classification Search
CPC .................. G01L 3/101; G01L 3/02
(Continued)

(56) References Cited

U.S. PATENT DOCUMENTS 7,028,545 B2 * 4/2006 Gandel .............. G01L 3/104
73/328
7,602,173 B2 * 10/2009 Reichert .............. G01L 3/104
324/207.13
(Continued)

FOREIGN PATENT DOCUMENTS

DE 102005031086 A1 1/2007
EP 1269133 B2 3/2010
(Continued)

OTHER PUBLICATIONS

Office Action dated Aug. 5, 2015 for Korean Patent Application No. 1020130158101.

*Primary Examiner* — Lisa Caputo
*Assistant Examiner* — Jamel Williams
(74) *Attorney, Agent, or Firm* — Schiff Hardin LLP (57) ABSTRACT

An embodiment discloses a sensor arrangement comprising disc shaped structure with a plurality of magnetic elements which are at least provided on end faces of the disc shaped structure. The sensor arrangement includes a hollow disc structure, the hollow disc structure comprising two end faces, wherein each of the two end faces of the second structure comprises a plurality of teeth spaced apart from each other, the teeth on the two end faces are arranged in opposing positions. Teeth on a respective same end face of the hollow disc structure are spaced from each other. The disc shaped structure is rotatable with respect to the hollow disc structure. A magnetic field sensor is provided to sense a magnetic field generated by the plurality magnetic elements.

24 Claims, 4 Drawing Sheets

(58) Field of Classification Search
USPC .................................................... 73/862.191
See application file for complete search history.

(56) References Cited

U.S. PATENT DOCUMENTS

| | | | | |
|---|---|---|---|---|
| 8,490,499 B2* | 7/2013 | Behrens | .................. | G01L 3/104 |
| | | | | 73/862.193 |
| 8,528,422 B2* | 9/2013 | Sanada | .................... | B62D 6/10 |
| | | | | 73/862.335 |
| 8,854,054 B2* | 10/2014 | Ludwig | ................ | G01D 5/2405 |
| | | | | 324/658 |
| 2004/0194560 A1* | 10/2004 | Froehlich | ................ | G01L 3/104 |
| | | | | 73/862.333 |

FOREIGN PATENT DOCUMENTS

| JP | 2004-020527 A | 1/2004 |
|---|---|---|
| JP | 2009133872 A | 6/2009 |

* cited by examiner

TORQUE SENSOR

RELATED APPLICATIONS

This application is a non-provisional application of provisional application number 61/757,888, which is filed on Jan. 29, 2013. The entire contents of the provisional application are hereby incorporated herein by reference. This non-provisional application hereby claims priority benefit of Chinese patent application 201210556327.8, which is filed on Dec. 20, 2012. The entire contents of the Chinese patent application are hereby incorporated herein by reference.

BACKGROUND ART

Torque sensors are applied broadly in the field of engineering industry, such as for example torque sensors used in an electric power assisted steering system of an automobile. Torque sensors may be based on a resistance potentiometer, in which a conventional torque sensor is in the form of a potentiometer. A mechanical contact is established and the contact position of the potentiometer changes. Since the potentiometer and a circular ring rub are continually in contact with the fixed wall, the frequent rotation of the potentiometer and the circular ring will render abrasion, which greatly reduces the life of the sensor. At the same time, because of the frictional resistance, performance may be poor during operation of the steer device. At the same time, the sensing precision of the sensor to the torque of the steer device will also be reduced. Furthermore, as to the conventional potentiometer torque sensors, the transition process from torque to an electric signal includes a lot of intermediate links and also involves quite a great number of components, which results in high costs.

Furthermore, a grating torque sensor is known, which measures a torsion angle by the relative displacement of the grating and then converts the change of a light beam into an electric signal and outputs a corresponding torque signal after amplification and corresponding processing by a circuit. The grating torque sensor is not subject to the problem of abrasion and has a longer life and a high precision as it is non-contact, however the manufacturing costs are quite high and the grating requires a high precision. Also the manufacturing process is more complicated, thus, the grating torque sensor is seldom adopted in a general electric power assisted steering system.

A further type of torque sensor uses a magnetic detection to detect a change of the position. It would be beneficial to have a torque sensor based on magnetic field detection with a simple structure, simple manufacturing process, and high precision.

SUMMARY OF THE INVENTION

According to one aspect, a sensor arrangement comprises a disc shaped structure with a plurality of magnetic elements which are at least provided on end faces of the disc shaped structure. The sensor arrangement includes a hollow disc structure, the hollow disc structure comprising two end faces, wherein each of the two end faces of the hollow disc structure comprises a plurality of teeth spaced apart from each other. The teeth on the two end faces are arranged in opposing positions. Teeth on a respective same end face of the hollow disc structure are spaced from each other. The disc shaped structure is rotatable with respect to the hollow disc structure. A magnetic field sensor is provided to sense a magnetic field generated by the plurality magnetic elements.

According to a further aspect, a torque sensor comprises a first shaft having an axis, a second shaft provided coaxially with the first shaft, a torsion bar connected to the first and second shaft. A structure is connected to the first shaft, wherein the structure comprises a plurality of magnetic elements, each of the plurality of magnetic elements having a magnetic moment which is parallel to the axis of the first shaft.

According to a further aspect, a method of determining a torque comprises detecting a change of a magnetic field, the change of magnetic field being caused by a relative rotation around a first axis between a disc shaped structure having a plurality of magnetic elements and a hollow structure having a plurality of magnetic conductive teeth. Each of the plurality of magnetic elements has a magnetic moment in a direction parallel to the first axis. Based on the detected change of the magnetic field, an applied torque is determined.

BRIEF DESCRIPTION OF THE DRAWINGS

An embodiment will be explained by examples with reference to the drawings, wherein.

DETAILED DESCRIPTION OF THE EMBODIMENTS

In the described embodiments, various specific views or schematic views of elements, devices, features, etc. are shown and described for a better understanding of embodiments. It is to be understood that such views may not be drawn to scale. Furthermore, such embodiments may not show all features, elements etc. contained in one or more figures with a same scale, i.e. some features, elements etc. may be shown oversized such that in a same figure some features, elements, etc. are shown with an increased or decreased scale compared to other features, elements etc.

In the various figures, identical or similar entities, modules, devices etc. may have assigned the same reference number. Example embodiments will now be described more fully with reference to the accompanying drawings. Embodiments, however, may be embodied in many different forms and should not be construed as being limited to the embodiments set forth herein. Rather, these example embodiments are provided so that this disclosure will be thorough and complete, and will fully convey the scope to those skilled in the art. In the drawings, the thicknesses of layers and regions are exaggerated for clarity.

It will be understood that when an element is referred to as being "on," "connected to," "electrically connected to," or "coupled to" to another component, it may be directly on, connected to, electrically connected to, or coupled to the other component or intervening components may be present. In contrast, when a component is referred to as being "directly on," "directly connected to," "directly electrically connected to," or "directly coupled to" another component, there are no intervening components present. As used herein, the term "and/or" includes any and all combinations of one or more of the associated listed items It will be understood that although the terms first, second, third, etc., may be used herein to describe various elements, components, regions, layers, and/or sections, these elements, components, regions, layers, and/or sections should not be limited by these terms. These terms are only used to distinguish one element, component, region, layer, and/or section from another element, component, region, layer, and/or section. For example, a first element, component, region, layer, and/or section could be termed a second element, component, region, layer, and/or section without departing from the teachings of example embodiments.

Spatially relative terms, such as "beneath," "below," "lower," "above," "upper," and the like may be used herein for ease of description to describe the relationship of one component and/or feature to another component and/or feature, or other component(s) and/or feature(s), as illustrated in the drawings. It will be understood that the spatially relative terms are intended to encompass different orientations of the device in use or operation in addition to the orientation depicted in the figures.

The terminology used herein is for the purpose of describing particular example embodiments only and is not intended to be limiting. As used herein, the singular forms "a," "an," and "the" are intended to include the plural forms as well, unless the context clearly indicates otherwise. It will be further understood that the terms "comprises," "comprising," "includes," and/or "including," when used in this specification, specify the presence of stated features, integers, steps, operations, elements, and/or components, but do not preclude the presence or addition of one or more other features, integers, steps, operations, elements, and/or components Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and should not be interpreted in an idealized or overly formal sense unless expressly so defined herein.

All the features or all the methods or all the steps in the process disclosed in the present specification can be combined with each other in any way if there is no conflict there between.

Any feature disclosed in the present specification (including and appending claims, the abstract and the drawings), unless described otherwise, can be substituted by other substitution feature which is equivalent or in similar purpose. That is, unless described otherwise, each feature is only an example of a series of equivalent or similar features.

Figure 4:
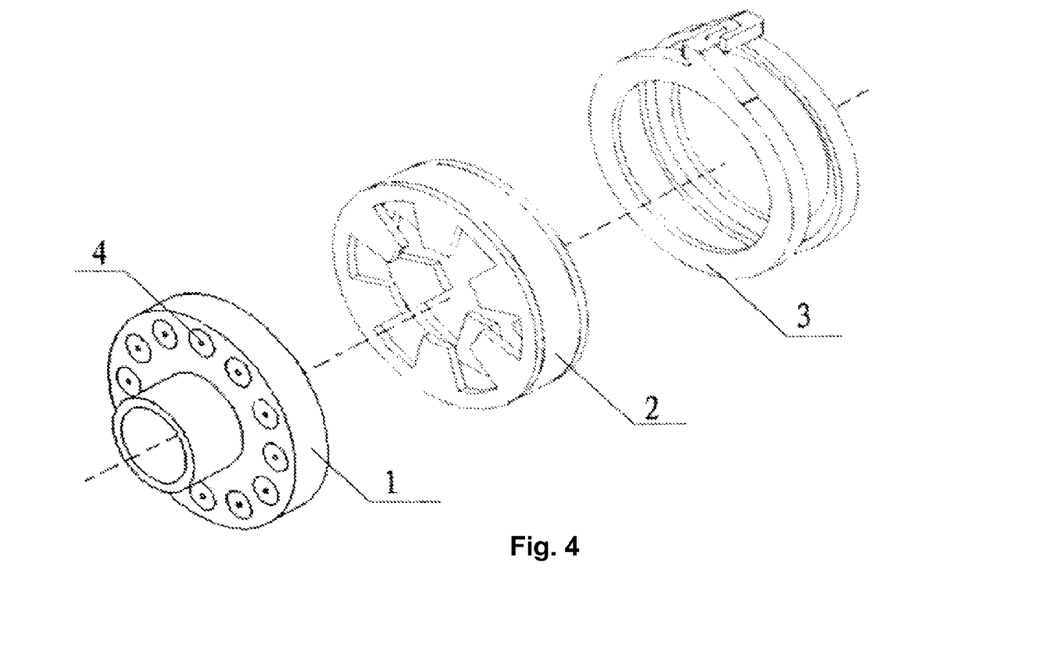
FIG. 4 is a structural schematic diagram of the three parts, the driving stage, the driven stage and the flux concentrator, according to an embodiment.

Referring now to FIG. 4, in embodiments described herein, a magnetic torque sensor comprises a driving stage 1, a driven stage 2, a flux concentrator 3 and magnetic elements 4.

The driving stage 1 comprises a disc 1-1 and a cylinder body 1-2. The cylinder 1-2 is connected at the center of the disc 1-1, and said cylinder body 1-2 can be connected with an outer driving shaft.

Figure 1:
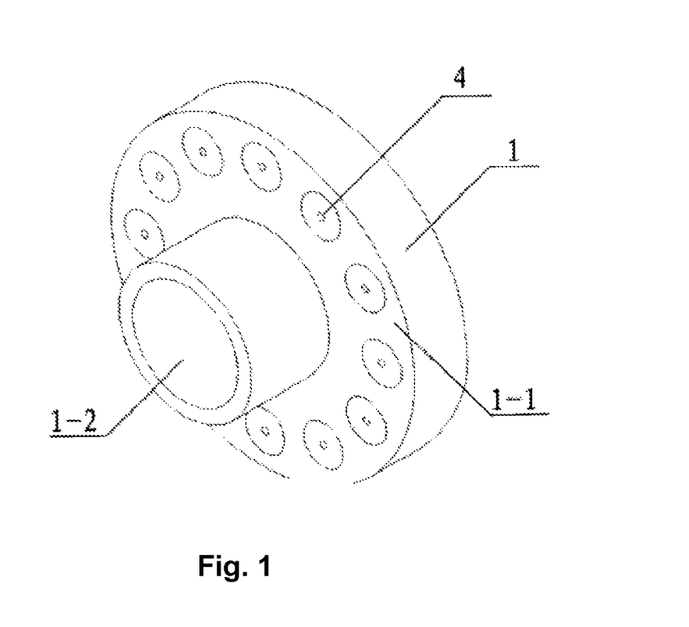
FIG. 1 is a schematic diagram of structure of the driving stage according to an embodiment.
Figure 6:
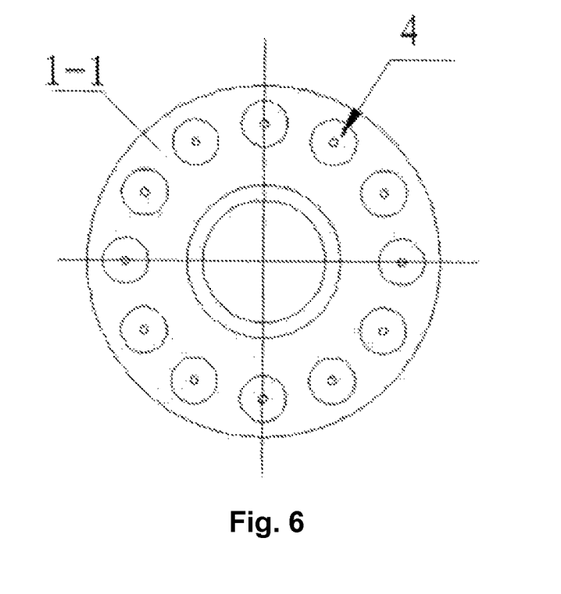
FIG. 6 is a front view of the driving stage according to an embodiment.

As shown in more details in FIG. 1 and FIG. 6 which shows a front view of the disc 1-1, the disc 1-1 is provided with T magnetic elements 4, wherein T is a number not less than 4. The magnetic elements 4 may be permanent magnets having a dipole with a magnetic moment parallel to an axis of the outer driving shaft, i.e. orthogonal to end faces of the disc 1-1. In the described embodiment, 12 magnetic elements 4 are used, i.e. T=12. According to some embodiments, T can be any of an even number such as 4, 6, 10, 12, 14 . . . . In some embodiments, the magnetic elements 4 may include bar magnets having a cylindrical form. In embodiments, holes can be arranged within the disc 1-1 for installing the magnetic elements 4, and said holes can be blind holes or through holes. Since the disc 1-1 has a relative thin thickness, in some embodiments blind holes may be used, resulting in only a slightly lower magnetic field being generated by the magnetic elements 4 compared to a later described embodiment using through holes. In general, the type and size of the holes can be selected according to the actual requirements.

In this embodiment, the blind holes are provided with magnetic elements 4 therein. The magnetic elements 4 and the holes have a same number. In this example, 12 blind holes are used, wherein each of the blind holes is provided with a magnetic element 4. The number of blind holes can be selected according to the number of magnetic elements 4. The blind holes are distributed evenly on a same circumference centered on the center of the disc 1-1. S and N-polarities are arranged alternatively between magnetic elements 4 in adjacent blind holes on the same end face of the disc 1-1, that is, any two adjacent magnetic elements 4 have opposite polarities on the same end face such that a regular alternating magnetic field distribution of a wave-like character is formed. The above mentioned blind holes are arranged as circular blind holes to facilitate the processing. Thus, for the convenience of installation, the magnetic element 4 is configured as a cylindrical structure, and the magnetic elements 4 are installed in the blind holes with the end faces of the magnetic elements 4 being flush with the two end faces of the disc 1-1, so that interference to the ring sheets 2-1 is avoided.

Figure 2:
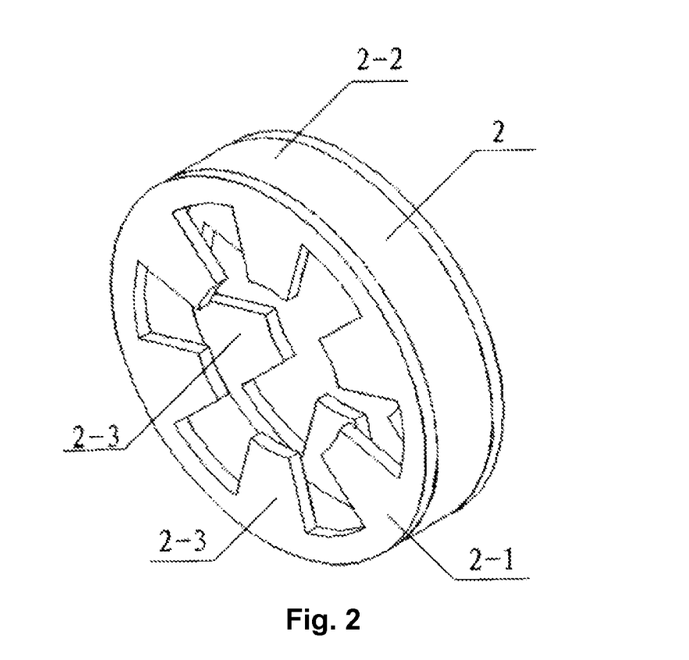
FIG. 2 is a schematic diagram of structure of the driven stage according to an embodiment.
Figure 7:
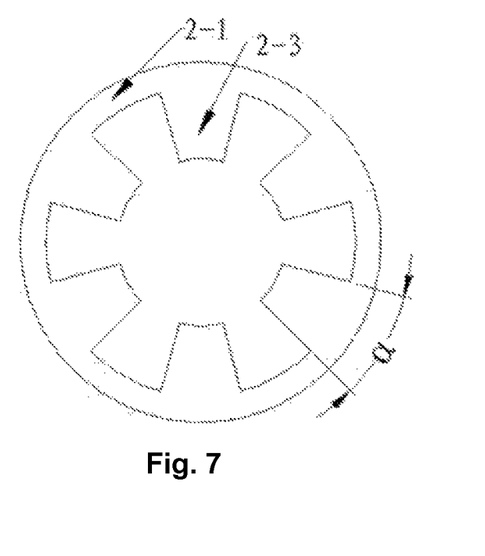
FIG. 7 is a front view of the driven stage according to an embodiment.

The driven stage 2 is shown in more detail in FIG. 2 and in FIG. 7 which shows a front view of the driven stage 2 of FIG. 2. The driven stage 2 comprises ring sheets 2-1 opposing each other, an outer circular ring 2-2 and teeth 2-3. Edge portions of the two ring sheets 2-1 are connected by the outer circular ring 2-2 such that the driven stage 2 has a hollow disc structure, wherein the disc 1-1 is located between the two ring sheets 2-1.

Figure 5:
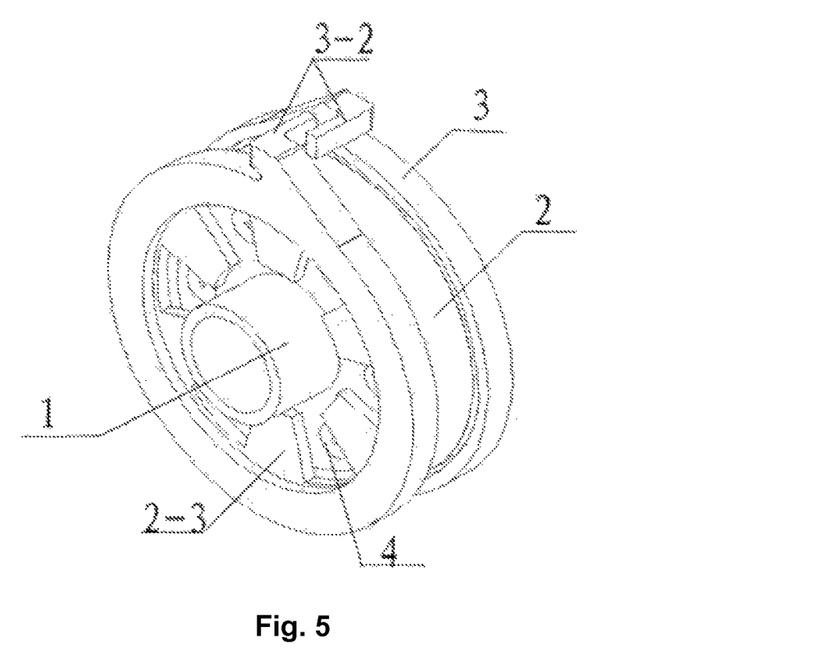
FIG. 5 is a schematic diagram of structure of the magnetic torque sensor according to an embodiment.

As can be seen from FIG. 5 showing the mounted sensor arrangement, the cylinder body 1-2 of the driving stage protrudes from the ring sheet 2-1 at one end, such that the driven stage 2 is capable of receiving the driving stage 1 therein.

Referring again to FIGS. 2 and 7, each of the two ring sheets 2-1 is provided with T/2 sector-shaped teeth 2-3 spaced from each other, with T being 12 in this example. Thus, each of the ring sheets 2-1 is provided with 6 teeth 2-3 each having sector-shaped structures. The teeth 2-3 are made of high magnetic-conductive material and are spaced from each other, wherein the spaces between the teeth 2-3 have the same structure as the teeth 2-3, which all have sector-shaped structures. The sector-shaped spaces and the sector-shaped teeth 2-3 have the same size in embodiments. Thus, the ring sheet 2-1 is provided with 6 sector-shaped teeth 2-3 and 6 sector-shaped spaces, which are distributed evenly on the same circumference centered on the center of the ring sheet 2-1. The magnetic elements 4 are opposite to the sector-shaped teeth 2-3 and sector-shaped spaces. A sector angle α between the sector-shaped tooth 2-3 and the sector-shaped spaces may be for example 30°. The number of the sector-shaped teeth 2-3 and the number of the sector-shaped spaces are T/2, determined based on the number of magnetic elements 4. The sector angle α is typically determined based on the number of the sector-shaped teeth 2-3 and the number of the sector-shaped spaces, and it is to be understood that in other embodiments other values may be provided.

Figure 3:
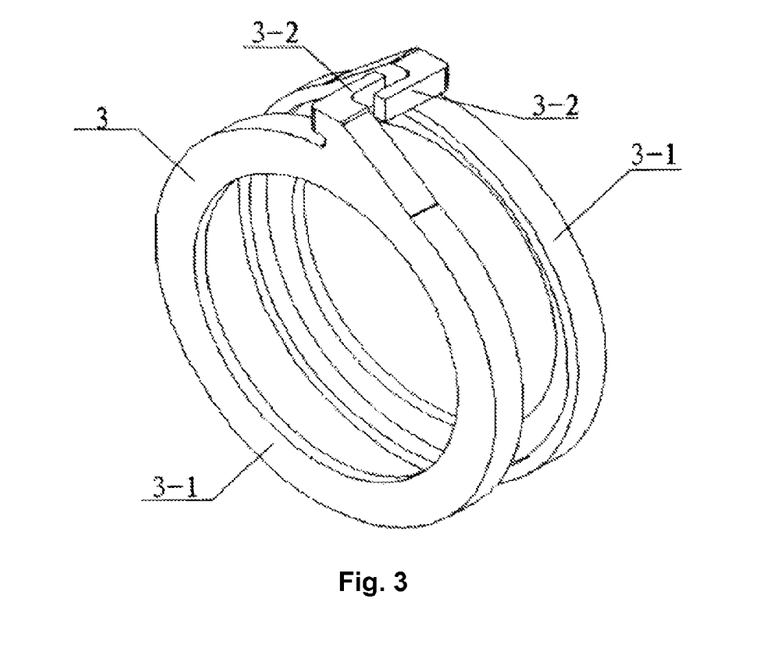
FIG. 3 is a schematic diagram of structure of the flux concentrator according to an embodiment.
Figure 8:
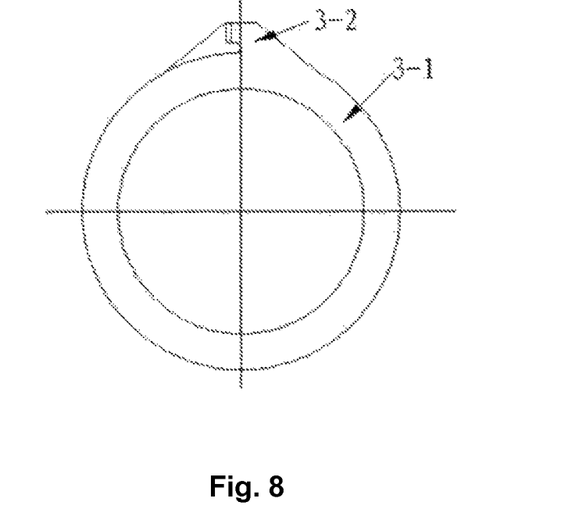
FIG. 8 is a front view of the flux concentrator according to an embodiment.

With reference to FIG. 3 which shows a view of the annular flux concentrator 3 and FIG. 8 which shows a front view thereof, a more detailed description of the annular flux concentrator 3 will now be given. As can be seen from FIG. 4 and FIG. 5, the annular flux concentrator 3 is provided to cover the edge portion of the driven stage 2, wherein the flux concentrator 3 comprises circular ring sheets 3-1 and installation blocks 3-2. The two circular ring sheets 3-1 are located respectively at the joints between the two ring sheets 2-1 and the outer circular ring 2-2, wherein the circular ring sheets 3-1 are magnetic conductive circular ring sheets 3-1 which are capable of collecting magnetic flux on the circular ring sheet to form an annular magnetic flux. The circular ring sheets 3-1 are stationary, and the driven stage 2 is rotatable with respect to the circular ring sheets 3-1. Each of the two circular ring sheets 3-1 is provided with an installation block 3-2. The two installation blocks 3-2 are arranged in opposite positions. The circular ring sheets guide the magnetic flux to the gap between the two installation blocks and collect the change of magnetic field information. The Hall-chip or any other magnetic sensor is installed in the gap between the two installation blocks 3-2, and the Hall-chip comprises a circuit chip and a Hall-sensor that is installed in the gap between the two installation blocks 3-2 for detecting magnetic field information. In some embodiments, the Hall-sensor is connected to the circuit chip and the circuit chip is connected to a micro-processing chip. The circuit chip converts the magnetic field information to an electric signal and transfers the same to the micro-processing chip. In some embodiments, the micro-processing chip controls rotation of a motor by the control circuit. The motor may drive the driven stage 2 to rotate in order to follow the rotation implied by the torque.

A further embodiment which will now be described below which is similar to the above described embodiment, except that in this embodiment the disc 1-1 in the driving stage is provided on its end faces with through holes for installing magnetic elements 4. The through holes are evenly distributed on a circumference centered on the center of the disc 1-1. The magnetic elements 4 are installed in the through holes and the two ends of the magnetic element 4 are flush with the two end faces of the disc 1-1. The number of the through holes is set as T=12 but it may be selected to include any number T, for example any even number such as 4, 6, 10, 12, 14 . . . . In the driven stage, the two ring sheets 2-1 are respectively provided on the end faces with teeth 2-3 being symmetrical to one another. The teeth 2-3 are tapering towards a center line of the ring sheets 2-1. The teeth 2-3 are formed of high magnetic-conductive sector-shaped structures. The teeth 2-3 on the same ring sheet 2-1 are spaced from each other, wherein the space is sector-shaped space having an identical structure or a similar structure as the teeth 2-3. Thus, the numbers of the teeth 2-3 and the sector-shaped spaces are respectively 6. In other embodiments, the number can be selected respectively to be T/2 according to respective requirements. The sector-shaped teeth 2-3 and the sector-shaped spaces are evenly distributed on the same circumference centered on the center of the ring sheets 2-1 and sandwiched together within the disc 1-1, between the two ring sheets 2-1 by mechanical installation. Moreover, the disc 1-1 is not in contact with the ring sheets 2-1 or the outer circular ring 2-2 such that the driving stage and the driven stage are rotatable with respect to another. The magnetic elements 4 on the disc 1-1 are opposite to the sector-shaped teeth 2-3 and sector-shaped spaces. The ratio of the number of teeth 2-3 to the number of magnetic elements 4 is 1:2. In this way, complete sinusoidal waveforms in a number of half of the number of the magnetic elements could be obtained by one revolution of the driving stage (if the driven stage does not rotate). The more the number of the magnetic elements 4, the more the number of sinusoidal waveforms of a magnetic field change during one revolution of the driving stage 1. It becomes clear that with an increased number of magnetic elements also a higher precision is obtained.

In the above mentioned example, T may be an arbitrary even number greater than or equal to 4, which is set according to actual requirement. At the same time, the magnetic elements 4 are installed on the disc 1-1, such that interferences between the magnetic elements 4 and the teeth 2-3 during the relative rotation between the driving stage 1 and the driven stage 2 are avoided. Thus, the disc 1-1 is provided with through holes or blind holes for installing the magnetic elements, which can be arranged according to the actual requirement. The sector angle α of the sector-shaped teeth 2-3 and sector-shaped spaces is determined according to the actual number of the teeth 2-3 and the spaces. Furthermore, according to embodiments, the teeth 2-3 and the spaces are even distributed along a circle centered in the center of the ring sheets 2-1. The driven stage is mainly composed of two ring sheets 2-1 provided with teeth 2-3 in conjunction with the outer circular ring 2-2. During the use, the two ring sheets 2-1 are installed on the outer circular ring 2-2 such that the disc 1-1 is restricted between the two ring sheets 2-1. During a manufacturing, any of the ring sheets 2-1 provided with teeth 2-3 and an outer circular ring 2-2 may be manufactured as one piece. For the use, the other ring sheet 2-1 provided with teeth 2-3 is then installed onto the outer circular ring 2-2. The manufacture and installation is thus easy and precise.

An embodiment of the working principle of the magnetic torque sensor will be explained now. In use, the driving stage is connected to an input shaft and the driven stage is connected to an output shaft. The input and output shaft are coupled by a torsion bar. When a torque is applied, the driving stage 1 is subjected to the torque and begins to rotate along the driving shaft (clockwise or counterclockwise) such that the disc 1-1 rotates. Since the torsion bar is coupled between the input and output shaft, the geometric position between the driven stage 2 and the driving stage 1 changes accordingly, and the magnetic field distribution formed by the permanent magnetic elements 4 on the driving stage 1 being arranged at the periphery also changes therewith. Since the disc shaped structure of the driving stage 1 is provided with the permanent magnetic elements 4 having alternative S and N-polarities, an undulating magnetic field distribution is rendered. The driven stage 2 is provided with teeth 2-3 made of high magnetic conductive material i.e. material with high magnetic permeability such as permalloy, mu-metal, ferrites, etc. The teeth 2-3 have symmetric sectors in a number of half of the number of the magnetic elements 4. This ensured that the sectors are substantially equally divided on the circumference For example, the circular magnetic elements are equally distributed on the circumference (with the axis of the disc as the circle center) with the center of adjacent magnetic elements being apart from each other by 30 degrees or any other angle depending on the number of magnetic elements. Then, there are 6 corresponding sector-shaped spaces, the center lines of adjacent sector-shaped spaces is apart from each other by 60 degrees, and the cut part has the same shape as the reserved part. In other words, 12 symmetric sectors are formed on the circumference, wherein 6 thereof are spaces and 6 thereof are teeth 2-3. The teeth 2-3 and the spaces are opposite to each other with the magnetic elements 4 between respective opposite spaces or teeth which allows the effective receiving of the magnetic field generated by the permanent magnetic element and collection of the magnetic flux. The circumference of the driving stage 1 alternatively forms a magnetic field that changes for several times in a 360-degree space. Along with the rotation of the driving shaft, the corresponding space magnetic field changes, and the magnetic intensity received by the driven stage 2 from the magnetic flux composed of high magnet conductive material also changes along therewith. The flux concentrator 3 is formed in a ring shape. The flux concentrator collects the change of magnetic field information and guides it to a preset location, i.e. the gap between the two installation blocks. The magnetic flux passes at the predetermined location through the Hall-chip allowing the Hall-chip detecting the amount of the magnetic field change quite easily, and thereby detect data such as the rotation angle of the driving stage 1 and the angular change rate. The magnetic field change is sensed by means of the Hall-chip, and the magnetic field change reflects the transformation of the rotation angle, from which the change value of torque can be calculated. The Hall-chip converts the magnetic field information into electrical signals and sends the same to the micro-processing chip for processing. In some embodiments, the above described torque sensor may be used for an electric power assisted steering system. In such embodiments, an instruction may be send out based on the determined torque to cause a motor to rotate. The motor drives the driven stage 2 to rotate along with the driving stage. In this way, the mechanical angle between the driving stage 1 and the driven stage 2 returns to the initial value, and the magnetic field change returns to the initial point, so that a mechanical shaft tracking is realized.

The magnetic torque sensor of an embodiment is applied broadly in the field of engineering industry, and besides an electric power assisted steering system of automobiles, it is also applied to other mechanical system in which it is necessary to sense the torque.

The magnetic torque sensor of an embodiment has simple structure, convenient mounting, simple process, high precision, long life, high reliability and simple magnetic field path, and broad applicability range. The magnetic elements can be made of hard material, which produce a higher magnetic intensity, benefiting the extraction of magnetic field signals. By providing the magnetic elements in holes, the position of the elements can be made very precise for example by high-precision drilling and the elements are protected from being degraded.

The driving stage and the driven stage cannot be separated from each other, thus the positioning is easy and the problem of positioning axle center during installation is relaxed. When being stored, the respective components may be provided internally with accessory shafts, to keep the driving stage and the driven stage coaxial, and after installation, the accessory shafts can either be drawn out or retained, which do not affect the operation of the sensor. The magnetic flux acquisition path, at the front and rear layers, are in a symmetrical structure, thus only one kind of processing model is enough, and the manufacture and installation are very simple. Moreover, it is unnecessary to arrange a deformable elastic shaft to restore the driving shaft and the driven shaft, and the structure is simple, with high precision and low cost.

In the above embodiments a new concept for a sensor arrangement and torque sensor have been described wherein the sensor arrangement may comprise a disc shaped structure, wherein a plurality of magnetic elements are at least provided on end faces of the disc shaped structure and a hollow disc structure, the hollow disc structure comprising two end faces, wherein each of the two end faces of the hollow disc structure comprises a plurality of teeth spaced apart from each other, wherein teeth on the two end faces are arranged in opposing positions, and wherein teeth which are provided on a respective same end face are spaced from each other; the disc shaped structure being rotatable with respect to the hollow disc structure and the torque sensor may comprise a first shaft having an axis, a second shaft provided coaxially with the first shaft, and a structure connected to the first shaft. The structure comprises a plurality of magnetic elements, each of the plurality of magnetic elements having a magnetic moment which is parallel to the axis of the first shaft.

In such a sensor arrangement, the plurality of teeth are distributed on a circumference centered on the center of the hollow disc structure the plurality of magnetic elements are distributed on a circumference centered on a center of the disc shaped structure. Each of the plurality of teeth extends in a direction towards the center such as for example in a tapered manner. The direction of a magnetic moment of each magnetic element may be orthogonal to end surfaces of the disk shaped structure. The disc shaped structure is connected to a first shaft and the hollow disc structure is connected to a second shaft coaxially to the first shaft, wherein the plurality of magnetic elements are arranged such that for each magnetic element a direction of magnetic moment is parallel to an axis of the first shaft and an axis of the second shaft. The disc shaped structure comprises a plurality of holes, the plurality of holes extending from one of the two end faces of the disc shaped structure to the other of the two end faces of the disc shaped structure, wherein the plurality of magnetic elements is arranged in the plurality of holes. The plurality of magnetic elements is arranged in an alternative polarity manner wherein adjacent magnetic elements have opposite magnetic polarities. A pair of magnetic conductive circular ring sheets at least partially surrounds the hollow disc structure, the pair of magnetic conductive circular ring sheets having an installation block for installing the magnetic field sensor such that magnetic flux is guided to the magnetic field sensor. The magnetic field sensor is provided between a first installation block of a first one of the pair of magnetic conductive circular rings and a second installation block of a second one of the pair of magnetic conductive circular rings.

The plurality of holes may include through holes or blind holes, and the plurality of magnetic elements may comprise a cylindrical structure, where each of the plurality of magnetic elements have its two end faces flush with the two end faces of the disc. The two end faces of the hollow disc structure are formed by opposing ring sheets of magnetic conductive material and the plurality of teeth are formed by structured segments of the opposing ring sheets. The structured segments of the opposing ring sheets may taper towards a center of a respective ring sheet. The disc shaped structure is connected to a first shaft and the hollow disc structure is connected to a second shaft, the sensor arrangement being configured to determine an applied torque based on a relative rotation between the disc shaped structure and the hollow disc structure.

Furthermore, in a concept of a torque sensor as described above a first shaft having an axis, a second shaft coaxially with the first shaft, and a structure connected to the first shaft may be provided. The structure comprises a plurality of magnetic elements, each of the plurality of magnetic elements having a magnetic moment which is parallel to the axis of the first shaft. The plurality of magnetic elements is arranged in holes of the structure, the holes extending in a direction parallel to the axis of the first shaft from a first end face of the structure to a second end face of the structure. The magnetic elements may have end faces which are flush with end faces of the structure. The plurality of magnetic elements may be provided with alternating polarity such that adjacent magnetic elements have magnetic moments in opposite directions. The structure is a disc-shaped circular structure. The plurality of magnetic elements may be distributed along a circle centered with respect to a center of the disc-shaped circular structure, the plurality of magnetic elements having a distance from the center less than a radius of the disc-shaped circular structure. The structure may be arranged in a hollow structure, and the hollow structure may comprise a plurality of magnetic conductive teeth. The plurality of magnetic conductive teeth may be provided on end faces of the hollow structure to oppose each other and the structure may extend between respective opposing teeth and respective opposing spaces. Each of the plurality of magnetic conductive teeth may extend in a direction towards a center line of the hollow structure, i.e. towards a line connecting the centers of the ring-shaped end faces of the hollow structure. Each of the plurality of magnetic conductive teeth tapers in a direction towards the center line of the hollow disc structure.

In the magnetic torque sensor, the driving stage may comprise a disc and a cylinder body, the cylinder body located at the center of the disc is connectable with the driving shaft, T holes with magnetic elements arranged therein are arranged on the disc, wherein T is an even number not less than 4, the holes with magnetic elements arranged therein are distributed evenly on the same circumference centered on the center of the disc, and S and N-polarities of the magnetic elements in adjacent holes on the same end face of the disc are arranged alternatively.

The use of holes with magnetic elements arranged therein as circular holes allows easy manufacturing e.g. by drilling which can be provided very precise. At the same time, the magnetic elements are made into circular structures, which can be installed in circular through holes conveniently. The two end faces of the magnetic element may be flush with the two end faces of the disc, and the magnetic elements correspond to the teeth, which will prevent the interference from occurring between the magnetic elements and the teeth during the rotation of the disc, and as a result, the relative rotation between the driving stage and the driven stage is ensured.

With the above mentioned structure, the driven stage may be mainly composed of the ring sheets, and the disc of the driving stage is sandwiched between the two ring sheets by mechanical installation. Moreover, the edge portions of the two ring sheets are connected via the outer circular ring, and the disc is located between the two ring sheets, rotatable relative to the ring sheets.

The driven stage may be provided with tooth-shaped rings of high magnet conductive material having symmetric sectors in a number of half of the number of the magnetic elements. It is ensured that the sectors are substantially equally divided on the circumference, with the axis of the disc as the circle center. The space between the teeth may be sector-shaped structure having identical structure as the teeth. The magnetic elements may be opposite to the sector-shaped teeth and the sector-shaped spaces, thus, it is possible to effectively receive the magnetic field generated by the permanent magnetic elements.

In the magnetic torque sensor of an embodiment, the flux concentrator comprises circular ring sheets and installation blocks, the two circular ring sheets are respectively located at the joints between the two ring sheets and the outer circular ring, and the driven stage is rotatable relative to the circular ring sheets, each of the two circular ring sheets is provided with the installation block, the two installation blocks are arranged at opposite positions, and the magnetic field sensor may be arranged in the gap between the two installation blocks.

To sum up, since the above mentioned technical solutions are used, embodiments have the various advantageous effects. For example, in the magnetic torque sensor of an embodiment, the magnetic elements can be made of hard material, which produces a higher magnetic intensity, benefiting the extraction of magnetic field signals; the driving stage and the driven stage cannot be separated from each other, thus facilitating the positioning. The problem of positioning the axle center during installation is also relaxed.

Furthermore, in the magnetic torque sensor of embodiments, when being stored, the respective components are provided internally with accessory shafts, to keep the driving stage and the driven stage coaxial, and after installation, the accessory shafts can either be drawn out or retained, which do not affects the operation of the sensor.

In operation, a torque determination process includes detecting a change of a magnetic field, the change of magnetic field being caused by a relative rotation around a first axis between a first structure having a plurality of magnetic elements and a second hollow structure having a plurality of magnetic conductive teeth, the plurality of magnetic elements each having a magnetic moment in a direction parallel to the first axis. Based on the detected change of the magnetic field and determining an applied torque.

In the above description, embodiments have been shown and described herein enabling those skilled in the art in sufficient detail to practice the teachings disclosed herein. Other embodiments may be utilized and derived there from, such that structural and logical substitutions and changes may be made without departing from the scope of this disclosure.

This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

It is further to be noted that specific terms used in the description and claims may be interpreted in a very broad sense. For example, the terms "circuit" or "circuitry" used herein are to be interpreted in a sense not only including hardware but also software, firmware or any combinations thereof. The term "data" may be interpreted to include any form of representation such as an analog signal representation, a digital signal representation, a modulation onto carrier signals etc. The term "information" may in addition to any form of digital information also include other forms of representing information. The term "entity" or "unit" may in embodiments include any device, apparatus circuits, hardware, software, firmware, chips or other semiconductors as well as logical units or physical implementations of protocol layers etc. Furthermore the terms "coupled" or "connected" may be interpreted in a broad sense not only covering direct but also indirect coupling.

It is further to be noted that embodiments described in combination with specific entities may in addition to an implementation in these entity also include one or more implementations in one or more sub-entities or sub-divisions of said described entity.

The accompanying drawings that form a part hereof show by way of illustration, and not of limitation, specific embodiments in which the subject matter may be practiced.

In the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, where each claim may stand on its own as a separate embodiment. While each claim may stand on its own as a separate embodiment, it is to be noted that—although a dependent claim may refer in the claims to a specific combination with one or more other claims—other embodiments may also include a combination of the dependent claim with the subject matter of each other dependent claim. Such combinations are proposed herein unless it is stated that a specific combination is not intended. Furthermore, it is intended to include also features of a claim to any other independent claim even if this claim is not directly made dependent to the independent claim.

Furthermore, it is intended to include in this detailed description also one or more of described features, elements etc. in a reversed or interchanged manner unless otherwise noted.

It is further to be noted that methods disclosed in the specification or in the claims may be implemented by a device having means for performing each of the respective steps of these methods.

Further, it is to be understood that the disclosure of multiple steps or functions disclosed in the specification or claims may not be construed as to be within the specific order. Therefore, the disclosure of multiple steps or functions will not limit these to a particular order unless such steps or functions are not interchangeable for technical reasons.

Furthermore, in some embodiments a single step may include or may be broken into multiple sub-steps. Such sub-steps may be included and part of the disclosure of this single step unless explicitly excluded.

What is claimed is:

1. A sensor arrangement, comprising:
   a disc shaped structure, wherein a plurality of magnetic elements are at least provided on end faces of the disc shaped structure;
   a hollow disc structure, the hollow disc structure comprising two end faces, wherein each of the two end faces of the hollow disc structure comprises a plurality of teeth spaced apart from each other, wherein teeth on the two end faces are arranged in opposing positions, and wherein teeth which are provided on a respective same end face are spaced from each other; the disc shaped structure being rotatable with respect to the hollow disc structure; and
   a magnetic field sensor to sense a magnetic field generated by the magnetic elements,
   wherein the disc shaped structure is connected to a first shaft and the hollow disc structure is connected to a second shaft, the sensor arrangement being configured to determine an applied torque based on a relative rotation between the disc shaped structure and the hollow disc structure.

2. The sensor arrangement according to claim 1, wherein the plurality of teeth are distributed on a circumference centered on the center of the hollow disc structure and wherein the plurality of magnetic elements are distributed on a circumference centered on a center of the disc shaped structure.

3. The sensor arrangement according to claim 2, wherein each of the plurality of teeth extends in a direction towards the center.

4. The sensor arrangement according to claim 3, wherein each of the plurality of teeth tapers in a direction towards the center of the hollow disc structure.

5. The sensor arrangement according to claim 1, wherein the magnetic elements are arranged in the disc shaped structure such that the direction of a magnetic moment of each magnetic element is orthogonal to end surfaces of the disk shaped structure.

6. The sensor arrangement according to claim 1, wherein the hollow disc structure is connected to the second shaft coaxially to the first shaft, and the plurality of magnetic elements are arranged such that for each magnetic element a direction of magnetic moment is parallel to an axis of the first shaft and an axis of the second shaft.

7. The sensor arrangement according to claim 1, wherein the disc shaped structure comprises a plurality of holes, the plurality of holes extending from one of the two end faces of the disc shaped structure to the other of the two end faces of the disc shaped structure, wherein the plurality of magnetic elements is arranged in the plurality of holes.

8. The sensor arrangement according to claim 6, wherein the plurality of magnetic elements is arranged in an alternative polarity manner wherein adjacent magnetic elements have opposite magnetic polarities.

9. The sensor arrangement according to claim 1, further comprising a pair of magnetic conductive circular ring sheets, the pair of magnetic conductive circular ring sheets at least partially surrounding the hollow disc structure.

10. The sensor arrangement according to claim 9, wherein the pair of magnetic conductive circular ring sheets comprises an installation block for installing the magnetic field sensor such that magnetic flux is guided to the magnetic field sensor.

11. The sensor arrangement according to claim 10, wherein the magnetic field sensor is provided between a first installation block of a first one of the pair of magnetic conductive circular rings and a second installation block of a second one of the pair of magnetic conductive circular rings.

12. The sensor arrangement according to claim 7, wherein the plurality of holes is a plurality of circular through holes, and wherein the plurality of magnetic elements comprises a cylindrical structure, each of the plurality of magnetic elements having its two end faces flush with the two end faces of the disc.

13. The sensor arrangement according to claim 1, wherein the two end faces of the hollow disc structure are formed by opposing ring sheets of magnetic conductive material, and wherein the plurality of teeth are formed by structured segments of the opposing ring sheets.

14. The sensor arrangement according to claim 13, wherein the structured segments of the opposing ring sheets taper towards a center of a respective ring sheet.

15. A torque sensor, comprising:
a first shaft having an axis;
a second shaft provided coaxially with the first shaft;
a structure connected to the first shaft; and
wherein the structure comprises a plurality of magnetic elements, each of the plurality of magnetic elements having a magnetic moment which is parallel to the axis of the first shaft, and
wherein the plurality of magnetic elements is arranged in holes of the structure, the holes extending in a direction parallel to the axis of the first shaft from a first end face of the structure to a second end face of the structure.

16. The torque sensor according to claim 15, wherein the plurality of magnetic elements have end faces which are flush with end faces of the structure.

17. The torque sensor according to claim 15, wherein the plurality of magnetic elements is provided with alternating polarity such that adjacent magnetic elements have magnetic moments in opposite directions.

18. The torque sensor according to claim 15, wherein the structure is a disc-shaped circular structure.

19. The torque sensor according to claim 18, wherein the plurality of magnetic elements is distributed along a circle centered with respect to a center of the disc-shaped circular structure, the plurality of magnetic elements having a distance from the center less than a radius of the disc-shaped circular structure.

20. The torque sensor according to claim 15, wherein the structure is arranged in a hollow structure, the hollow structure comprising a plurality of magnetic conductive teeth.

21. The torque sensor according to claim 20, wherein the plurality of magnetic conductive teeth are provided on end faces of the hollow structure to oppose each other, wherein the structure extends between respective opposing teeth.

22. The torque sensor according to claim 20, wherein each of the plurality of magnetic conductive teeth extends in a direction towards a center line of the hollow structure.

23. The torque sensor according to claim 22, wherein each of the plurality of magnetic conductive teeth tapers in a direction towards the center line of the hollow disc structure.

24. A method of determining a torque, comprising:
detecting a change of a magnetic field, the change of magnetic field being caused by a relative rotation around a first axis between a first structure having a plurality of magnetic elements and a second hollow structure having a plurality of magnetic conductive teeth, the plurality of magnetic elements each having a magnetic moment in a direction parallel to the first axis, wherein the plurality of magnetic elements is arranged in holes of the first structure, the holes extending in a direction parallel to the first axis from a first end face of the first structure to a second end face of the first structure; and
based on the detected change of the magnetic field, determining an applied torque.

* * * * *